United States Patent Office 2,812,344
Patented Nov. 5, 1957

2,812,344

FERROUS CALCIUM CITRATE COMPLEX

William Oroshnik, Plainfield, N. J., assignor to Ortho Pharmaceutical Corporation, a corporation of New Jersey No Drawing. Application February 13, 1956,
Serial No. 564,856

5 Claims. (Cl. 260—439)

This invention relates to a new therapeutically effective compound for providing a source of calcium and iron in the diet and more particularly relates to a new therapeutic compound in the nature of a ferrous, calcium salt of citric acid.

Heretofore, it has been the established practice to administer a calcium salt of an organic acid, such as citric or gluconic acid, and iron in the form of ferrous sulfate to provide a source of calcium and iron in the diet of humans where indicated. Supplemental sources of calcium and iron are frequently required by anemic, pregnant, and aged patients.

Although the administration of calcium in the form of a salt of an organic acid, such as citric and gluconic acid, and the administration of iron in the form of ferrous sulfate has been the accepted practice, it has long been recognized that there are certain undesirable features inherent in their administration in the diet. It has been reported that simultaneous administration of iron and calcium usually results in a mutual interference with the utilization of both. Kletzien, Journal of Nutrition, volume 19, page 187, 1940; and Anderson et al., Journal of Laboratory and Clinical Medicine, volume 25, page 464, 1939; concluded that calcium in the form of the gluconate or citrate salts exerted an adverse effect on iron assimilation and storage of iron in the liver, and that within limits ordinarily reached in most diets, calcium impedes the absorption of iron.

It has been frequently observed that the administration in the diet of ferrous compounds such as ferrous sulfate consistently causes some degree of digestive discomfort. Youmans, Journal of the American Medical Association, volume 143, page 1252, 1950; summarized the undesirable features due to the addition of ferrous compounds in the diet by stating that patients undergoing such treatment traditionally complain of gastro-intestinal symptoms, nausea, cramps, diarrhea and epigastric distress from taking iron; but if the patients persist in continuing to take iron, the symptoms usually disappear, probably due to an acquired tolerance.

Iron preparations in liquid form, and solutions of ferrous sulfate in particular, are offensive to taste. Ferrous compounds are unstable and are readily oxidized to the ferric form, particularly on exposure to light.

It is an object of this invention to provide a stable, tasteless, therapeutic compound in the nature of a ferrous calcium salt of citric acid.

It is another object of this invention to provide a stable, tasteless therapeutic compound containing chemically bound calcium and iron in the ferrous state which upon oral administration are utilized normally without mutual interference between the calcium and iron and without gastro-intestinal disturbances, constipation or diarrhea.

It is still another object of this invention to provide a new and improved therapeutic tablet effective by oral administration in providing a supplemental source of calcium and iron in the diet.

Other and further objects of this invention will be apparent from the description to follow, the examples and the appended claims.

It has now been discovered that a compound having the empirical formula $Fe(CaC_6H_5O_7)_2 \cdot 4H_2O$ and the probable structural formula

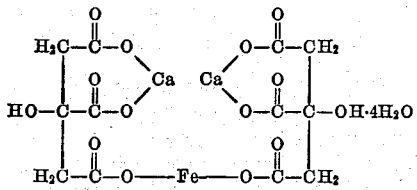

in which the four molecules of water are bound by coordinate covalencies to the calcium and iron atoms, may be prepared from the mono-calcium salt of citric acid such as that obtained by reacting citric acid with an equimolar amount of calcium base such as calcium carbonate, calcium oxide, or calcium hydroxide. The mono-calcium salt of citric acid thus formed is reacted with metallic iron and a crystalline, ferrous calcium citrate complex is formed. The complex is a stable, tasteless, colorless powder and is very stable to air oxidation, the ferrous content remaining substantially unchanged after six months of storage in air at ordinary temperatures in the absence of direct light. However, removal of the water by vacuum desiccation at elevated or room temperature results in spontaneous auto-oxidation of the complex with the conversion of the ferrous iron of the complex to the ferric state. The dehydrated compounds continue to oxidize to the ferric state when allowed to stand at room temperature even in the absence of light. The structure of the dehydrated compound or of the mixture of compounds formed on dehydration is not known but X-ray diffraction patterns and chemical analysis show it to be an entirely different chemical entity from that of the hydrated material having the above formula.

The following examples are set forth for the purpose of illustrating the method of preparing the ferrous calcium citrate complex and compositions of matter in dosage unit form according to this invention but are not to be construed as a limitation.

*Example I*

Two hundred grams of finely powdered calcium carbonate were suspended in one liter of water and the suspension was added to a solution of 420 grams of the monohydrate of citric acid in solution in three liters of water. During the addition, the suspension of calcium carbonate was agitated and the solution of citric acid monohydrate was rapidly stirred. The addition was made at room temperature and stirring was continued at room temperature for about one-half hour and at the end of this time the turbidity of the mixture was greatly diminished. 57.3 grams of reduced powdered iron was slowly added to the above solution and during addition the reaction mixture was rapidly stirred. After all the iron had been added, the mixture was heated to boiling as quickly as possible and refluxed while being stirred for five hours and then filtered while hot. The solid colorless material on the filter was washed thoroughly with water and isopropanol and dried at room temperature in a desiccator at atmospheric pressure. 510 grams of colorless, tasteless crystalline ferrous calcium citrate complex were obtained. The complex was not discolored after exposure to indirect or artificial light for a period of time exceeding six months, but becomes light brown in color on exposure to direct sunlight for several days. The calculated values for calcium and iron for a compound having the empirical formula $Fe(CaC_6H_5O_7)_2 \cdot 4H_2O$ are 13.67% and 9.53% respectively. Analysis of the material prepared according to the example showed the presence of 13.42% calcium and 9.52% iron. 99.80% of the total iron present was in the ferrous state, the remaining 0.2% being in the ferric state.

*Example II*

Ferrous calcium citrate complex prepared according to Example I was allowed to remain in a desiccator over phosphorus pentoxide at a pressure of less than one millimeter of mercury until it was at a constant weight. This required ten days and at this time the loss in weight corresponded to the loss of four molecules of water for each molecule of complex.

Ferrous calcium citrate complex having four molecules of bound water, prepared according to Example I, was kept in a vacuum desiccator over phosphorus pentoxide at 80° C. for fifteen hours and also at 200° C. for ten minutes. The loss in weight in both instances corresponded to the loss of four molecules of water for each molecule of complex.

During the dehydration periods in each case, spontaneous auto-oxidation took place with substantial amounts of iron being converted from the ferrous to the ferric state. The dehydrated materials in each instance continued to oxidize when allowed to stand at room temperature even in the absence of light.

The results of dehydration studies given below in tabular form show the effect of dehydration on the complex, the numerical values representing percentages of total iron in the ferric state after dehydration. The values given for zero days represent the percentage of total iron in the ferric state immediately after dehydration had been completed and the other values represent the percentage of total iron in the ferric state at intervals of up to fifteen days of standing at room temperature in the dark after dehydration had been completed.

| Time in days After Completion of Dehydration | Dehydration at Room Temperature | Dehydration at 80° C. | Dehydration at 200° C. |
|---|---|---|---|
| 0 | 5.5 | 10.0 | 9.6 |
| 1 | 11.5 | 16.0 | 15.8 |
| 2 | 19.2 | 21.7 | 22.9 |
| 3 | | 24.7 | 26.0 |
| 4 | 21.5 | 31.1 | 30.7 |
| 5 | | 34.4 | 36.8 |
| 6 | 27.4 | | |
| 7 | | 36.6 | 36.8 |
| 8 | | 39.8 | 38.2 |
| 13 | 35.7 | | |
| 15 | | 45.8 | 45.8 |

*Example III*

Ten grams of ferrous calcium citrate complex having four molecules of bound water, prepared according to Example I, were ashed by heating in air at 1000° C. A residue of 3.300 grams of mixed calcium and ferric oxides was obtained. The calculated amount of such oxides from ten grams of complex is 3.275 grams.

*Example IV*

Ten grams of ferrous calcium citrate complex having four molecules of bound water, prepared according to Example I, was oxidized with a mixture of concentrated sulfuric and nitric acids and the oxidized material was then ashed in air at 1000° C. A residue of 5.996 grams of mixed calcium sulfate and ferric oxide was obtained. The calculated amount of mixed calcium sulfate and ferric oxide is 6.006 grams.

In employing the ferrous calcium citrate complex of the present invention for the provision of a source of calcium and iron in the diet, the complex may be uniformly distributed in a suitable vehicle and formed into a tablet. Inert diluents or fillers are chosen which are chemically compatible with the complex. Satisfactory diluents include lactose, dextrose, sucrose, sodium chloride, glycine, kaolin and starch. It is desirable that a binder such as acacia, zein, tragacanth, gelatin, sodium carboxymethylcellulose, or methyl cellulose and also, in order that a tablet may be readily prepared, that a lubricant such as magnesium stearate, zinc stearate, mineral oil, stearic acid, stearyl alcohol or mono- and polyglycol esters also be intimately admixed with the filler and active agent. The above ingredients, including the complex, may be formed into a tablet by thoroughly mixing the ingredients in a moist condition, granulating and compressing the mixture into tablets by conventional methods. Diluents such as tricalcium citrate and ferrous citrate may be used alone or with inert diluents if it is desired to increase or decrease the ratio of calcium to iron in the tablet or formulation.

*Example V*

| | Milligrams |
|---|---|
| $Fe(CaC_6H_5O_7)_2 \cdot 4H_2O$ | 300 |
| Dipotassium phosphate | 50 |
| Acacia | 50 |
| Magnesium stearate | 30 |
| Lactose | 70 |

*Example VI*

| | |
|---|---|
| $Fe(CaC_6H_5O_7)_2 \cdot 4H_2O$ | 300 |
| Dipotassium phosphate | 50 |
| Acacia | 50 |
| Magnesium stearate | 30 |
| Lactose | 70 |
| Cellulose acetate-phthalate | 50 |

The novel ferrous calcium citrate complex to which the present invention is directed, has been found to have value for the provision of a source of calcium and iron where the administration of these elements in the diet is indicated and is particularly valuable for oral administration in the diet of anemic, pregnant, and aged individuals.

The ferrous calcium citrate complex, prepared according to Example I, and ferrous sulfate were each administered to a group of rat siblings which had been previously rendered deficient in iron. No significant difference was detected between the ability of two sources of iron to promote hemoglobin regeneration in the nutritionally anemic rats. After four weeks of administration the rats receiving the ferrous calcium citrate complex and ferrous sulfate both showed equal gains in hemoglobin and in weight.

Three to three and one-half grams of ferrous calcium citrate complex, prepared according to Example I, was administered over a period of twenty days to human subjects, previously maintained for twenty days on a diet low in calcium. It was found that the calcium of the ferrous calcium citrate complex was utilized well within the normal range of the utilization to be expected from the administration of conventional supplemental calcium sources such as calcium gluconate.

One and one-half to one and three-fourths grams of ferrous calcium citrate complex, prepared according to Example I, and an equal amount of tricalcium citrate were administered daily over a period of at least two months to thirty-eight pregnant women and at this time there was no incidence of intolerance to the complex or any side effects noted. Gains in hemoglobin were all consistent and rapidly progressive.

Since certain changes in carrying out the above process and certain modifications in the compositions which embody the invention may be made without departing from its scope, it is intended that all matter contained in the description shall be interpreted as illustrative and not in a limiting sense.

This application is a continuation-in-part of my application Serial No. 348,549, filed April 13, 1953, now abandoned.

What is claimed is:

1. A ferrous calcium citrate complex having the formula

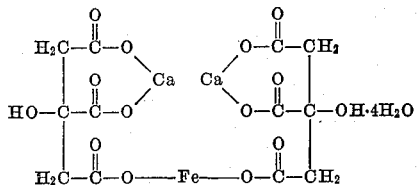

2. A composition of matter for oral administration effective as a source of calcium and iron in the diet which comprises a ferrous calcium citrate complex having the formula

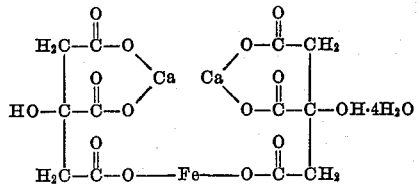

3. A composition of matter in dosage unit form for oral administration effective as a source of calcium and iron in the diet which comprises a ferrous calcium citrate complex having the formula

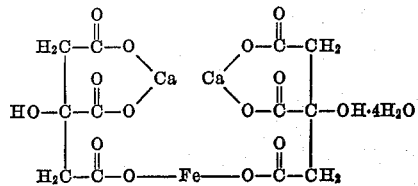

in intimate admixture with a solid diluent.

4. A process for the preparation of a ferrous calcium citrate complex having the formula

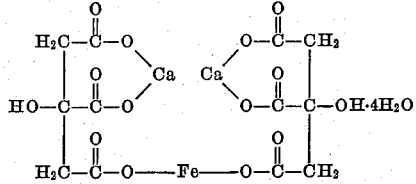

comprising the steps of adding metallic iron to a solution of mono-calcium citrate, whereby the complex is formed and precipitated, and removing the precipitated complex.

5. A process for the preparation of a ferrous calcium citrate complex having the formula

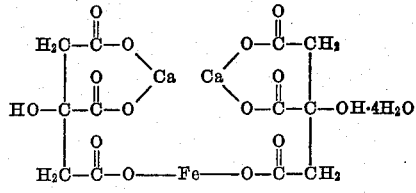

comprising the steps of adding a calcium base to a solution of citric acid, whereby the mono-calcium salt of citric acid is formed, adding metallic iron to the solution of mono-calcium salt of citric acid, whereby the complex is formed and precipitated, and removing the precipitated complex.

References Cited in the file of this patent
UNITED STATES PATENTS 2,691,666   Opfermann _____ Oct. 12, 1954